United States Patent
Fujii et al.

(10) Patent No.: US 12,519,180 B2
(45) Date of Patent: Jan. 6, 2026

(54) BATTERY LID

(71) Applicant: FUJI SPRINGS CO., INC., Hyogo (JP)

(72) Inventors: Akira Fujii, Hyogo (JP); Toshihiro Odagaki, Hyogo (JP); Katsuhisa Kawai, Hyogo (JP)

(73) Assignee: FUJI SPRINGS CO., INC., Hyogo (JP)

(*) Notice: Subject to any disclaimer, the term of this patent is extended or adjusted under 35 U.S.C. 154(b) by 659 days.

(21) Appl. No.: 17/912,397

(22) PCT Filed: Mar. 2, 2021

(86) PCT No.: PCT/JP2021/007949
§ 371 (c)(1),
(2) Date: Sep. 16, 2022

(87) PCT Pub. No.: WO2021/187089
PCT Pub. Date: Sep. 23, 2021

(65) Prior Publication Data
US 2023/0048535 A1 Feb. 16, 2023

(30) Foreign Application Priority Data
Mar. 18, 2020 (JP) ................... 2020-047160
Jul. 27, 2020 (JP) ................... 2020-126227
Aug. 26, 2020 (JP) ................... 2020-142541

(51) Int. Cl.
*H01M 50/342* (2021.01)
*H01M 50/159* (2021.01)

(52) U.S. Cl.
CPC ..... *H01M 50/3425* (2021.01); *H01M 50/159* (2021.01); *H01M 2200/20* (2013.01)

(58) Field of Classification Search
CPC .......... H01M 50/3425; H01M 50/159; H01M 2200/20; H01M 50/15; Y02E 60/10
See application file for complete search history.

(56) References Cited

U.S. PATENT DOCUMENTS

2001/0027807 A1 10/2001 Morishita et al.
2003/0131880 A1 7/2003 Marubayashi et al.
(Continued)

FOREIGN PATENT DOCUMENTS

JP 11-297292 10/1999
JP 2001-102023 4/2001
(Continued)

OTHER PUBLICATIONS

International Search Report dated May 25, 2021 in corresponding International Application No. PCT/JP2021/007949.
(Continued)

*Primary Examiner* — Eugenia Wang
(74) *Attorney, Agent, or Firm* — Wenderoth, Lind & Ponack, L.L.P.

(57) ABSTRACT

A battery lid includes a metal plate integrally formed with a valve and a surrounding plate portion surrounding the valve which is configured to facilitate rupturing the valve at a predetermined pressure. The valve includes a pressure receiving plate portion having a bending groove, and being bendable from the bending groove by pressure applied to the valve, and a thin plate portion which is thinner than the surrounding plate portion, and connects the pressure receiving plate portion to the surrounding plate portion. The thin plate portion has a rupture groove passing through extension sections on respective lines extending from the bending groove. As the pressure receiving plate portion is deformed by the pressure applied to the valve, the extension sections are pulled more strongly than are other sections in the valve. Therefore, when the predetermined pressure is applied, the valve is ruptured from the extension sections of the rupture groove.

12 Claims, 8 Drawing Sheets

(56) References Cited

U.S. PATENT DOCUMENTS

| | | | |
|---|---|---|---|
| 2007/0059586 A1* | 3/2007 | Matsumoto | H01M 50/3425 |
| | | | 429/82 |
| 2009/0068550 A1* | 3/2009 | Uh | H01M 50/3425 |
| | | | 429/82 |
| 2016/0293917 A1* | 10/2016 | Matsudo | H01M 50/3425 |
| 2020/0194759 A1 | 6/2020 | Shimada | |
| 2021/0175577 A1 | 6/2021 | Shiotani et al. | |

FOREIGN PATENT DOCUMENTS

| | | |
|---|---|---|
| JP | 2001-102024 | 4/2001 |
| JP | 2001-325934 | 11/2001 |
| JP | 2002-367583 | 12/2002 |
| JP | 2008-282679 | 11/2008 |
| JP | 2012-182008 | 9/2012 |
| JP | 2014-182949 | 9/2014 |
| JP | 2016-157570 | 9/2016 |
| JP | 2019-40679 | 3/2019 |
| WO | 2018/123578 | 7/2018 |

OTHER PUBLICATIONS

Written Opinion of the International Searching Authority issued May 25, 2021 in International (PCT) Application No. PCT/JP2021/007949 (with English translation).

\* cited by examiner

BATTERY LID

TECHNICAL FIELD

The present invention relates to a battery lid formed of a metal plate, and used to seal the opening of a battery case.

BACKGROUND ART

For lithium-ion batteries, nickel-metal hydride batteries, etc., as a battery case for receiving the power generating element of such a battery, a sealed battery case is conventionally used which includes a battery lid attached to the tube opening of a tubular case body having a bottom.

As such a battery lid, a battery lid is widely used which comprises a metal plate integrally formed with a valve that is ruptured when a predetermined pressure is applied thereto; and a surrounding plate portion surrounding the valve and connected to the valve. This type of battery lid is generally mass-produced by pressing using progressive dies. The valve functions as a safety valve for avoiding the explosion of the battery case due to an abnormal increase in the battery internal pressure.

During pressing of the valve, dowel processing is conventionally used to form a dowel forming portion protruding toward one side, and a thin plate portion having a thickness smaller than the maximum thickness of the dowel forming portion, and smaller than the thickness of the surrounding plate portion, the thin plate portion coupling the dowel forming portion and the surrounding plate portion to each other (see e.g., Japanese Unexamined Patent Application Publication No. 2001-102023, hereinafter "JP 2001-102023"). By using dowel processing to form the valve, since the dowel forming portion is formed to protrude toward one side of the metal plate, it is possible to reduce the amount of an excess portion of the metal plate pushed out in the feeding direction or the width direction when forming the valve. Also, it is possible to use a thicker metal plate or a metal plate of which the material strength is higher, without increasing die strength, or pressing (pressure applying) capability.

SUMMARY OF THE INVENTION

Problems to be Solved by the Invention

Increasing battery capacity is still pursued. Due to an increase in the battery capacity, it is important to improve the explosion preventing performance against a sharp rise in internal pressure of the battery caused when an abnormality occurred in the battery. For this purpose, it tends to be required to increase the size of the battery case for such a battery, and to increase the opened area of the above valve.

JP 2001-102023 discloses a battery lid formed with a circular, dowel forming portion of which the entire plate surface on one side is located at a certain height; and a thin plate portion located around the dowel forming portion, and connected to the entire circumference of the dowel forming portion. The plate surfaces of the thin plate portion on the one side and the other side each has a concave circular arc-shaped cross section. The thin plate portion has a rupture groove engraved to have a bottom having a certain depth, and to extend in the circumferential direction. The thickness of the rupture groove at its bottom is the smallest in the valve. Since the plate portion surrounding the valve is thicker and more rigid than the thin plate portion, as the pressure applied to the valve (internal pressure of the battery) increases, the thin plate portion, which has a circular annular shape, is pulled toward the outer side around the entire circumference, and the valve bulges. When the pressure reaches a predetermined value, the bottom of the rupture groove succumbs to the above tensile stress at its random portion, and the rupture of the rupture groove progresses quickly from this portion, thereby rupturing and opening the valve quickly. Therefore, the internal pressure of the battery which has increased abnormally can be released quickly to outside.

However, if, in the battery lid of JP 2001-102023, the entire length of the thin plate portion, which has the rupture groove, is increased so that the valve opens widely with ease, the cost for managing the pressure by which the valve is ruptured (rupture pressure), to a predetermined level is expected to increase.

In particular, it is inevitable in pressing that, due to the plastic flow of an excess portion of the metal plate when engraving the rupture groove in the thin plate portion, the thickness or the shape of the thin plate portion changes irregularly near the rupture groove. Therefore, even if the circumferentially extending rupture groove is engraved on the circular annular-shaped thin plate portion, the tensile stress applied to the rupture groove, or the deformation amount of the thin plate portion, by which it is deformed, is not uniform, and inevitably somewhat varies, around the entire circumference. In view of this irregularity, the quality management for guaranteeing rupture pressure is performed by measuring the thicknesses of the rupture groove at many circumferentially displaced portions of its bottom, which is the weakest against the tensile stress.

In the case where the opened area of the valve is increased corresponding to a large-sized battery case as in JP 2001-102023, if production is performed without substantially changing the die accuracy, the above irregular change tends to increase, thus destabilizing the rupture pressure. Therefore, die accuracy is required more than now, thus making it difficult to produce dies, and significantly affecting the production cost. Also, since the entire length of the rupture groove is long/large, this lengthens the area of which the thickness needs to be managed, and increases the number of portions required to be measured for the quality management for guaranteeing rupturing pressure, thus affecting the quality management cost.

In view of the above background, it is an object of the present invention to provide a battery lid which facilitates the management for rupturing the valve of the battery lid by a predetermined pressure.

Means for Solving the Problems

In order to achieve the above object, the present invention provides a battery lid comprising a metal plate integrally formed with: a valve configured to be ruptured when a predetermined pressure is applied to the valve; and a surrounding plate portion surrounding the valve, and connected to the valve, characterized in that the valve comprises: a pressure receiving plate portion configured to be bent from a bending groove by pressure; and a thin plate portion having a thickness smaller than the thickness of the surrounding plate portion, and connecting the pressure receiving plate portion and the surrounding plate portion to each other, wherein the thin plate portion has a rupture groove engraved to have a depth in a thickness direction, and to pass through extension sections on respective imaginary lines extending from the bending groove, and wherein the valve is configured such that, as the pressure receiving plate portion is bent from the bending groove and deformed by pressure applied to the valve, the extension sections are pulled more strongly than are any portions of the valve other than the extension sections in the valve, such that, when the predetermined pressure is applied to the valve, the valve is ruptured from one of the extension sections of the rupture groove.

Effects of the Invention

Since the battery lid of the present invention has the above structure, the sections of which the thicknesses need to be measured at the rupture groove of the thin plate portion of the valve can be limited to the sections on the lines extending from the bending groove of the pressure receiving plate portion, and the thickness management at the other sections can be alleviated. This facilitates the management for rupturing the valve by a predetermined pressure.

BEST MODE FOR CARRYING OUT THE INVENTION

The first embodiment as one example of the battery lid according to the present invention is described below with reference to the attached drawings.

Figure 1:
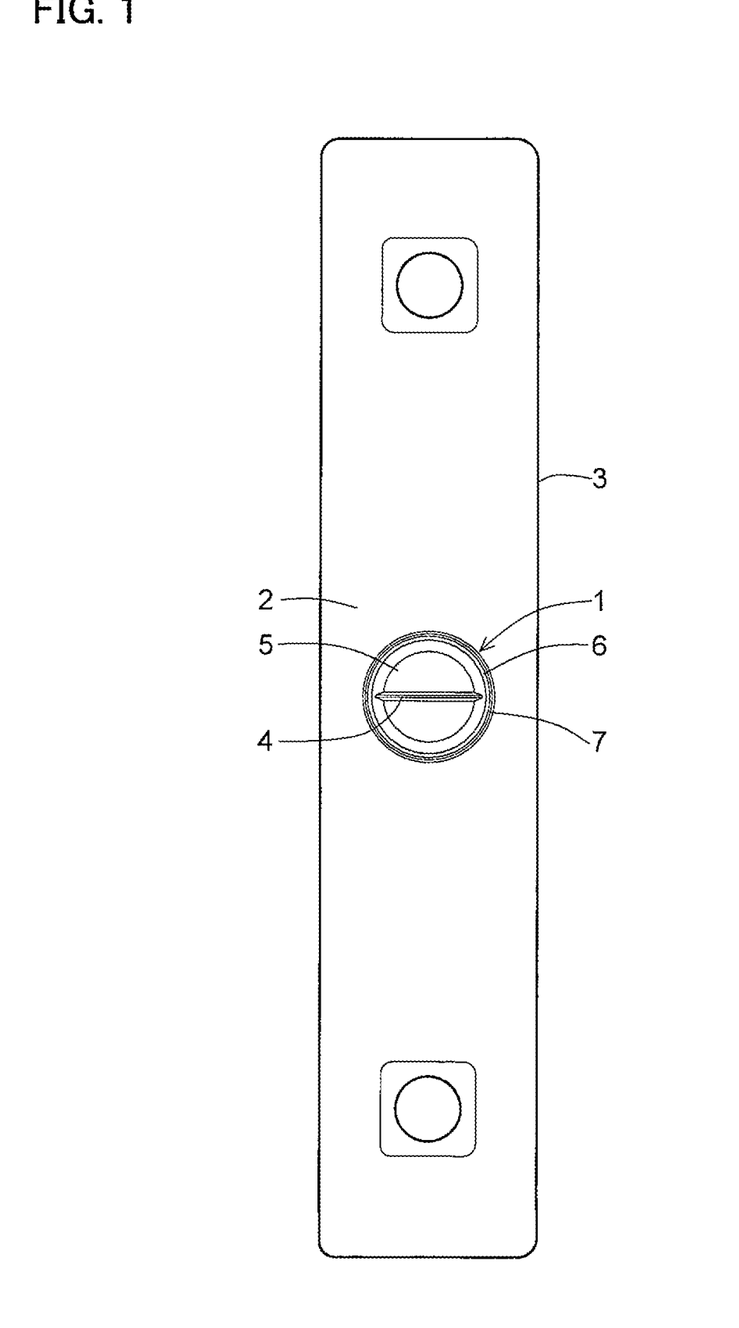
FIG. 1 is a front view of a battery lid according to a first embodiment of the present invention.

The battery lid of FIG. 1 comprises a metal plate integrally formed with (i) a valve 1 configured to be ruptured when a predetermined pressure is applied thereto; and (ii) a surrounding plate portion 2 surrounding the valve 1 and connected to the valve 1. This battery lid is exemplified as being used for a square/rectangular battery. The peripheral edge 3 of the battery lid is joined to the tube opening (not shown) of a tubular case body having a bottom.

The metal plate is generally a material that can be pulled out from an uncoiler, and be pressed by progressive dies, and representative examples thereof include, e.g., an aluminum alloy plate.

Figure 2:
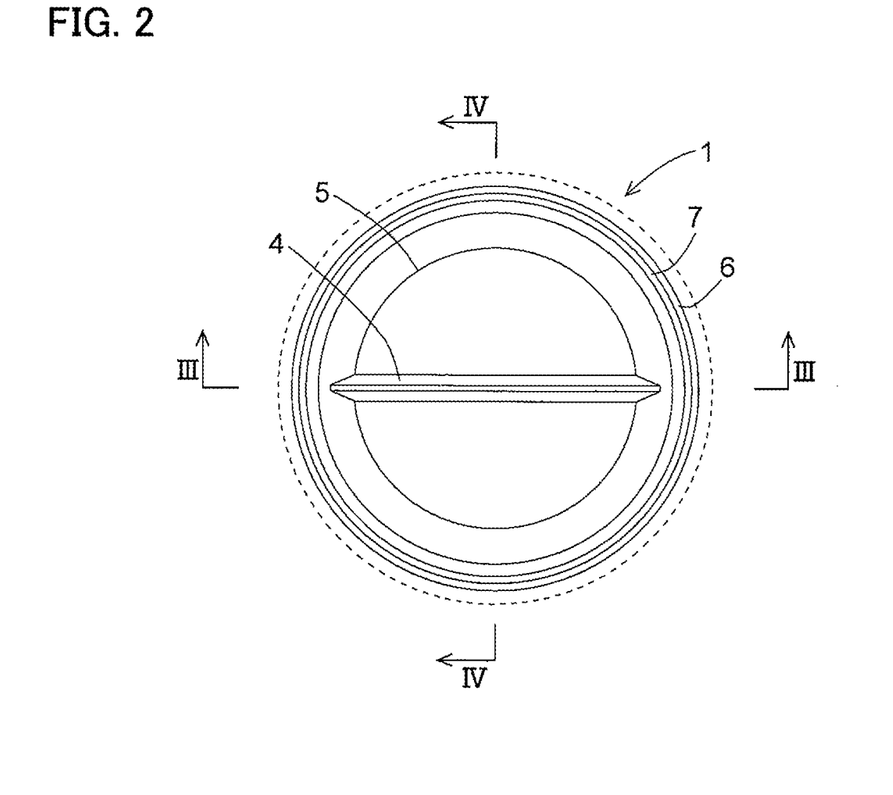
FIG. 2 is an enlarged partial front view of the valve of FIG. 1.
Figure 3:
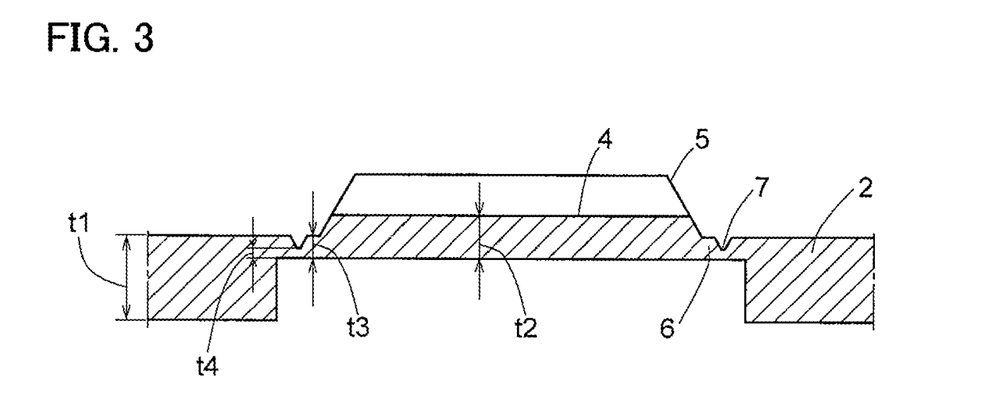
FIG. 3 is a sectional view taken along line III-III of FIG. 2.
Figure 4:
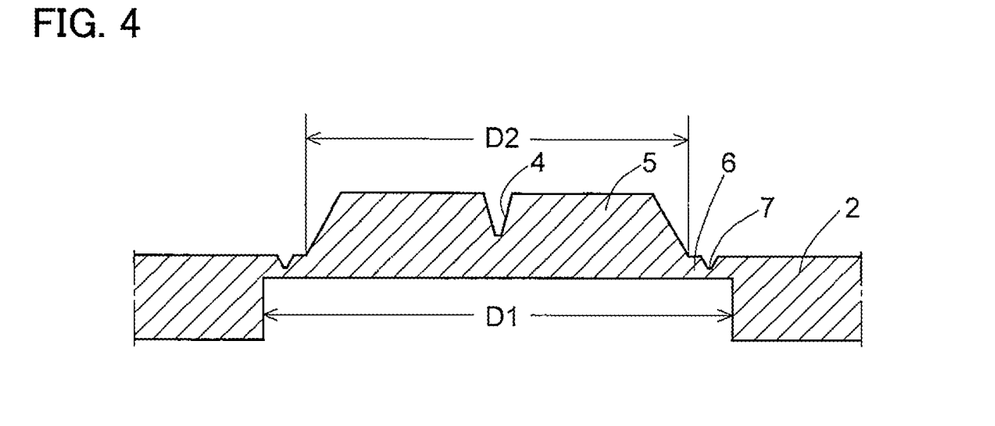
FIG. 4 is a sectional view taken along line IV-IV of FIG. 2.

As illustrated in FIGS. 2 to 4, the valve 1 is constituted by a pressure receiving plate portion 5 having a bending groove 4, and configured to be bent from the bending groove 4 by applied pressure; and a thin plate portion 6 having a thickness smaller than the thickness t1 of the surrounding plate portion 2, and connecting the pressure receiving plate portion 5 and the surrounding plate portion 2 to each other.

The thickness t1 of the surrounding plate portion 2 is the thickness of the section of the plate portion 2 adjacent to the valve 1, and is substantially equal to the thickness of the metal plate from which the battery lid is formed. The thickness of the metal plate is preferably not less than 2.0 mm and not more than 5.0 mm, and more preferably more than 3.0 mm and not more than 5.0 mm. By setting the thickness of the metal plate to not less than 2.0 mm, the battery lid can have a strength suitable for a battery case having a large size. By setting the thickness to more than 3.0 mm, such a battery lid makes it possible to increase the size of the battery case to a level that has been difficult to achieve. By setting the thickness to not more than 5.0 mm, the battery lid can be formed by pressing using progressive dies.

The pressure receiving plate portion 5 protrudes, relative to the thin plate portion 6, high toward one side, and also has a protruding height relative to the surrounding plate portion 2, toward the one side. The "one side" refers to one side of the battery lid in its thickness direction, and the other side of the battery lid in its thickness direction is referred to as "the other side". In FIGS. 3 and 4, the thickness direction corresponds to the vertical direction, the one side corresponds to the upper side, and the other side corresponds to the lower side.

The bending groove 4 extends straight while having a depth in the thickness direction from the plate surface of the pressure receiving plate portion 5 located at the highest level on the one side. The bending groove 4 has a V-shaped cross-sectional shape having a flat surface-shaped bottom extending perpendicularly to the thickness direction. While the bending groove 4 is exemplified as extending straight across the pressure receiving plate portion 5, both end portions or one end portion of the bending groove may be closed by the outer periphery of the pressure receiving plate portion. The surface shape extending perpendicularly to the thickness direction is hereinafter simply referred to as the "flat surface shape" or "flat surface-shaped".

The pressure receiving plate portion 5 has only one bending groove 4. The pressure receiving plate portion 5 and the thin plate portion 6 are both symmetrical with respect to the symmetry plane passing through the widthwise center of the bending groove 4, and extending in the thickness direction. The symmetry plane corresponds to the imaginary plane including the surface cut along line III-III of FIG. 2. While, in FIGS. 2 to 4, the protruding portion of the pressure receiving plate portion 5 other than the bending groove 4 is exemplified as having a truncated cone shape, the protruding portion may have a different shape such as a columnar shape, a long elliptical shape, or a rhombic shape.

The plate surface of the pressure receiving plate portion 5 on the other side and the plate surface of the thin plate portion 6 on the other side form a recessed bottom surface having a depth toward the one side from the plate surface of the surrounding plate portion 2 on the other side, and having the flat surface shape.

The thin plate portion 6 is a circular annular portion extending along the pressure receiving plate portion 5. The thin plate portion 6 has a rupture groove 7 engraved to have a depth in the thickness direction, and to pass through sections on the lines extending from the bending groove 4. "The sections on the lines extending from the bending groove 4" refer to, when considering the imaginary extension lines extending from the respective ends of the bending groove 4 in the direction in which the bending groove 4 extends, the areas opposed in the thickness direction to, or intersecting with, the above imaginary extension lines, respectively. More specifically, if there is a difference in height between the bottom of the bending groove 4 and the thin plate portion 6 as in the shown example, they correspond to the areas opposed, in the thickness direction, to the above imaginary extension lines, respectively; and, if there is no difference in height therebetween, they correspond to the areas intersecting with the above imaginary extension lines, respectively.

The shown rupture groove 7 is engraved as a circumferential groove on the one side of the thin plate portion 6. The circumferential groove has the same center axis as the circumference/outer periphery of the pressure receiving plate portion 5. The rupture groove 7 has a V-shaped cross-sectional shape having a flat surface-shaped bottom.

The plate surface of the thin plate portion 6 located between, and connected to, the rupture groove 7 and the pressure receiving plate portion 5 has the flat surface shape. The plate surface of the thin plate portion 6 located between, and connected to, the rupture groove 7 and the surrounding plate portion 2 also has the flat surface shape, and lies on the same plane as the plate surface of the surrounding plate portion 2 on the one side.

The minimum thickness t2 of the pressure receiving plate portion 5 is the thickness thereof at the bottom of the bending groove 4, and is larger than the maximum thickness t3 of the thin plate portion 6 and smaller than the thickness t1 of the surrounding plate portion 2. The minimum thickness t4 of the thin plate portion 6 is the thickness thereof at the bottom of the rupture groove 7, and is sufficiently smaller than any of the thicknesses t1 to t3. In order to ensure that the starting point of rupture of the valve 1 lies on the rupture groove 7, thereby eliminating the need to manage the thickness of the pressure receiving plate portion 5 at the bottom of the bending groove 4, the minimum thickness t2 of the pressure receiving plate portion 5 needs to be larger than the thickness t4 of the thin plate portion 6 at the bottom of the rupture groove 7. The minimum thickness t2 of the pressure receiving plate portion 5 may be changed to a value equal to or smaller than the maximum thickness t3 of the thin plate portion 6, provided that the valve is not ruptured until the pressure receiving portion 5 receives pressure exceeding a predetermined value.

Figure 5:
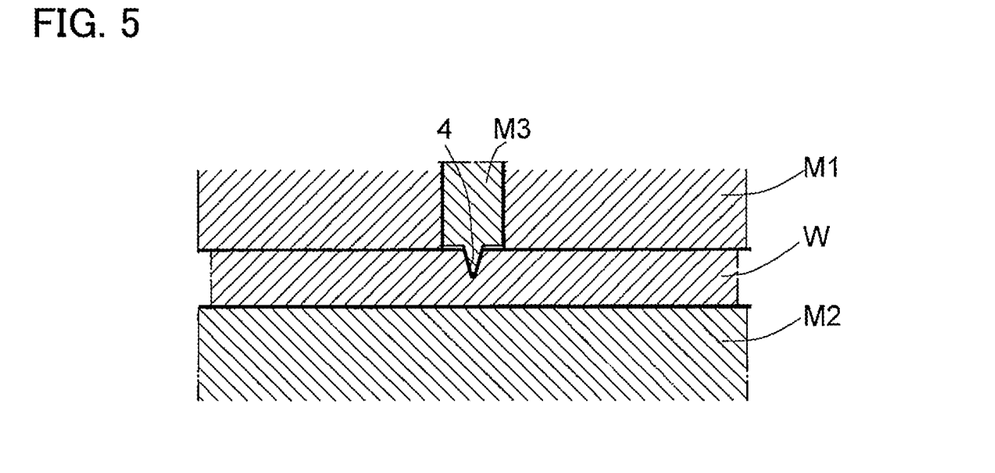
FIG. 5 is a sectional view showing an engraving step for forming the bending groove of FIG. 2.
Figure 6:
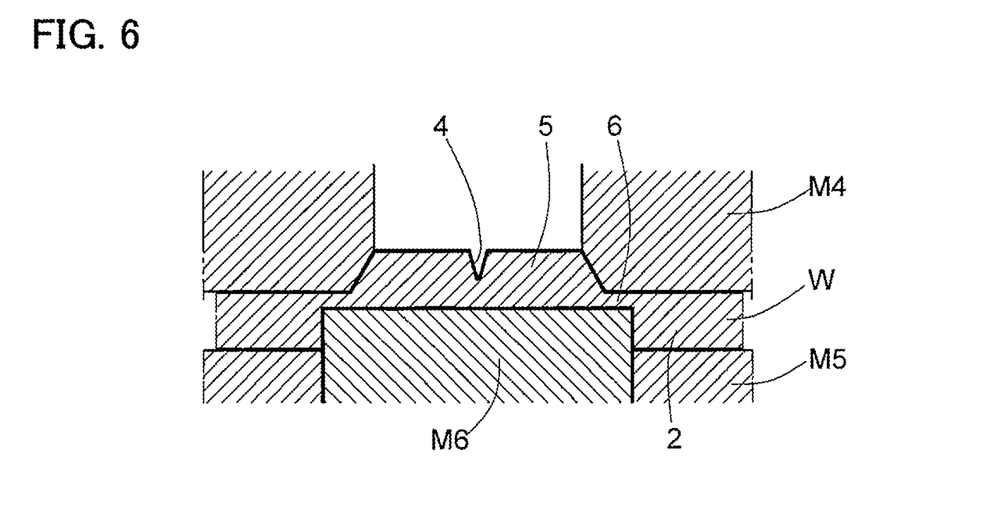
FIG. 6 is a sectional view showing the step of forming the pressure receiving plate portion and the thin plate portion of FIG. 2.
Figure 7:
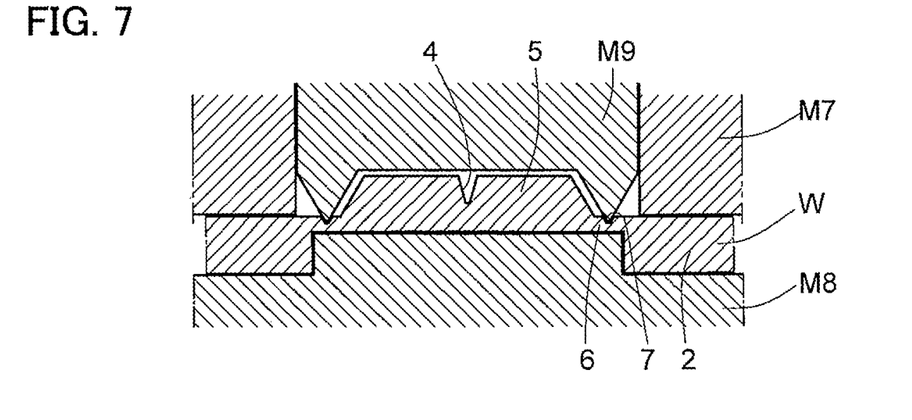
FIG. 7 is a sectional view showing an engraving step for forming the rupture groove of FIG. 2.

FIGS. 5 to 7 exemplify a method for forming the above-described valve 1 by pressing using progressive dies. First, as illustrated in FIG. 5, a portion W of a strip-shaped metal plate to be worked on is fed into the space between an upper die M1 and a lower die M2, and the bending groove 4 is engraved thereon by an engraving die part M3 of the upper die M1. The portion W is then fed into the space between an upper die M4 and a lower die M5 (shown in FIG. 6), and the upper die M4 and a lower punch M6 form, on the portion W, the pressure receiving plate portion 5 and also the plate surfaces of the thin plate portion 6 on both sides thereof. The portion W is then fed into the space between an upper die M7 and a lower die M8 (shown in FIG. 7), and the rupture groove 7 is engraved thereon by an engraving die part M9 of the upper die M7. In the subsequent step, the portion W is trimmed to form the peripheral edge 3 of the battery lid shown in FIG. 1. The method of producing the valve 1 is not limited to the above-exemplified method. For example, the bending groove 4 and the rupture groove 7 may be formed simultaneously.

For the thicknesses t1 to t4 shown in FIGS. 3 and 4, the difference between the thicknesses t1 and t3 (t1–t3), the difference between the thicknesses t2 and t3 (t2–t3), and the difference between the thicknesses t3 and t4 (t3–t4) are each set to a positive value large enough to be able to eliminate the necessity of strict management of the thicknesses of the battery lid at its portions other than the bottom of the rupture groove 7 considering irregular deformation of the rupture groove 7 when engraved.

For example, if the thickness t1 of the surrounding plate portion 2 is set to 2 mm or more, the lid can be formed such that the pressure receiving portion 5 accounts for 50% or more of the area of the valve 1, to which pressure is applied, and has a thickness of 50% or more of the thickness of the above metal plate. The maximum diameter D1 of the valve 1 can be set to, e.g., 22 mm or more. The maximum diameter D2 of the protruding portion of the pressure receiving plate portion 5 can be set to, e.g., 18 mm or more, and smaller than the diameter D1. The maximum thickness t3 of the thin plate portion 6 can be set to 0.3 mm or less. The minimum thickness t4 of the thin plate portion 6 can be set to 0.06 mm or less. The minimum thickness t2 of the pressure receiving plate portion 5 can be set to not less than 0.3 mm and not more than 1 mm.

Figure 8:
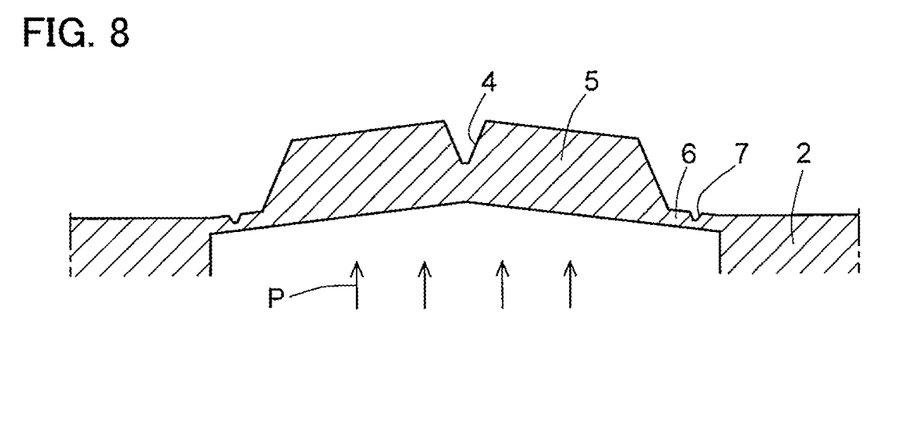
FIG. 8 is a sectional view showing the state in which the pressure receiving plate portion of FIG. 1 is bent.
Figure 9:
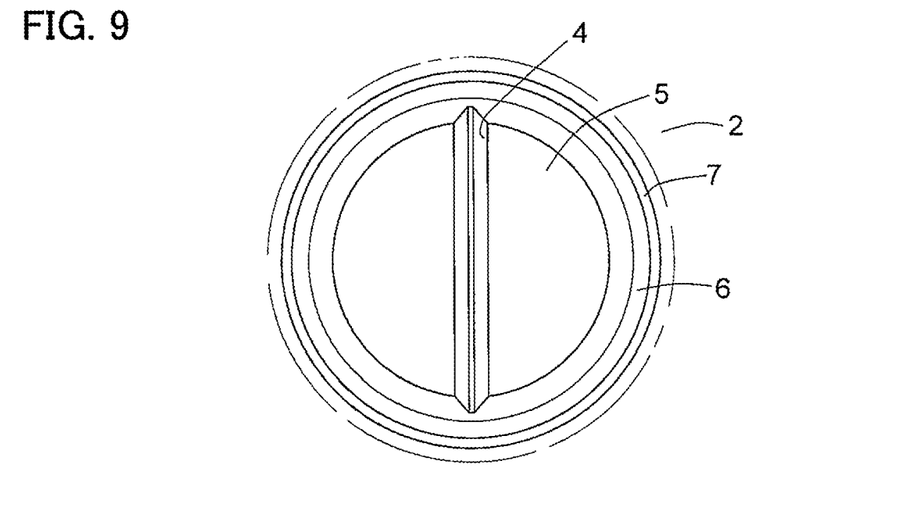
FIG. 9 is a partial front view of the valve in the state of FIG. 8.
Figure 10:
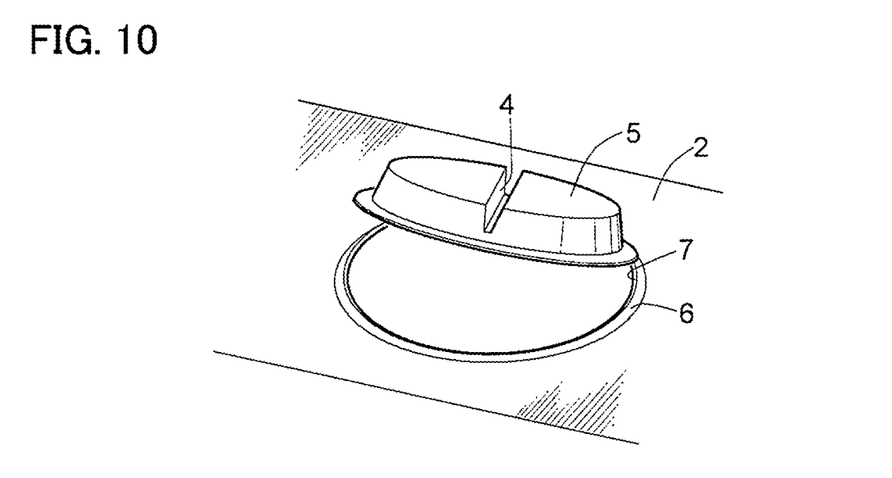
FIG. 10 is a partial perspective view showing the state in which the valve of FIG. 8 is ruptured.

When the internal pressure in the battery (not shown) including the battery lid of FIG. 1 increases, pressure (internal pressure of the battery) P is applied to the valve 1 from the other side toward the one side, thereby pushing, relative to the surrounding plate portion 2, the pressure receiving plate portion 5 and the thin plate portion 6 toward the one side. By the pressure P, as illustrated in FIGS. 8 and 9, the pressure receiving plate portion 5 is bent from the bending groove 4 and deformed. Due to this bend and deformation, because the portion of the pressure receiving plate portion 5 where the bending groove 4 is formed is deformed to a larger degree than any other portions of the valve 1, the sections of the valve 1 on the lines extending from the bending groove 4 are pulled more strongly than are the other sections of the valve 1. More specifically, the sections of the thin plate portion 6 on the lines extending from the bending groove 4 (sections intersecting with the imaginary extension lines extending in the vertical direction of FIG. 9 within the width of the bending groove 4 are pulled most strongly toward the bending groove 4 in the valve 1. This maximum tensile stress changes with the magnitude of the pressure P applied to the valve 1. When the pressure P applied to the valve 1 reaches a predetermined value, the bottom of the rupture groove 7 is ruptured at one of the sections on the lines extending from the bending groove 4 ruptured by succumbing to the tensile stress, and the valve 1 starts to be ruptured from this section. As the valve 1 is ruptured rapidly along the bottom of the rupture groove 7, the opened area of the valve 1 increases as illustrated in FIG. 10.

Even if, in an area of the thin plate portion 6, displaced from the sections on the lines extending from the bending groove 4, which are measured areas where the minimum thickness t4 of the thin plate portion 6 (its thickness at the bottom of the rupture groove 7) is measured, the thin plate portion 6 has a thickness smaller than the minimum thickness within the above measured areas, since the tensile stress due to the bend and deformation of the pressure receiving plate portion 5 is not uniform in magnitude, the valve 1 will never start to be ruptured from such an area, i.e., an area other than the sections on the lines extending from the bending groove 4.

As described above, in the battery lid of FIG. 1, the rupture groove 7 is a portion of the valve 1 particularly weak against the tensile stress. When pressure is applied to the valve 1, and the pressure receiving plate portion 5 is bent from the bending groove 4, since the sections of the valve 1 on the lines extending from the bending groove 4 are pulled more strongly than any other sections of the valve 1, the rupture starting point from which the valve 1 starts to be ruptured at a predetermined pressure is limited to the sections of the rupture groove 7 on the lines extending from the bending groove 4. Therefore, in order to perform the thickness measurement of the thin plate portion at the bottom of the rupture groove 7, which is required for the management for rupturing the valve 1 at a predetermined pressure, it is only required to measure the sections on the lines extending from the bending groove 4. Also, wider manufacturing error ranges are allowed for the other sections in the thickness direction, and thus the management accuracy of the other sections can be reduced. Therefore, for this battery lid, since, in order to measure the thickness of the thin plate portion 6 at the rupture groove 7, it is only required to measure the sections on the lines extending from the bending groove 4 of the pressure receiving plate portion 5, and thus no strict management of the thicknesses of the other sections is required, it is possible to facilitate the management for rupturing the valve 1 at a predetermined pressure.

Also, for this battery lid, even if the thickness of the metal plate and the opened area of the valve 1 are increased corresponding to a large-sized battery case, because the protruding shape of the pressure receiving plate portion 5 is formed by pressing, it is possible to reduce the pressing pressure, the amount of an excess portion of the metal plate pushed out in the width direction, die accuracy, etc., thus making it possible to reduce the manufacturing cost, and the quality management cost for managing the pressure at which the valve 1 is ruptured.

Especially because this battery lid has only the above-described two sections on the lines extending from the bending groove 4 and has no other such sections around the pressure receiving plate portion 5, and because the valve is formed symmetrically with respect to the symmetry plane passing through the widthwise center of the bending groove 4, and extending in the thickness direction, the number of sections of which the thicknesses need to be measured can be limited to the minimum number, i.e., two. Also, it is possible to reduce the plastic flow of the metal plate material when forming the bending groove 4, and thus to reduce the difficulty of pressing.

For example, while two bending grooves crossing each other can be formed in the pressure receiving plate portion, this means that there are four sections on the lines extending from the two bending grooves around the pressure receiving plate portion 5. This complicates management, and is disadvantageous in production because, for example, the amount of a portion of the metal plate material pushed out by plastic flow increases.

Also, since the pressure receiving plate portion 5 of this battery lid has an outer periphery protruding, relative to the thin plate portion 6, toward the one side around the entire circumference, when forming the pressure receiving plate portion 5 and the thin plate portion 6, it is possible to reduce plastic flow by pushing an excess portion of the metal plate material to the protruding portion of the pressure receiving plate portion 5, and thus to reduce the difficulty of pressing, compared to the arrangement in which the minimum thickness t2 of the pressure receiving plate portion 5 and the maximum thickness t3 of the thin plate portion 6 are equal to or substantially equal to each other.

Figure 11:
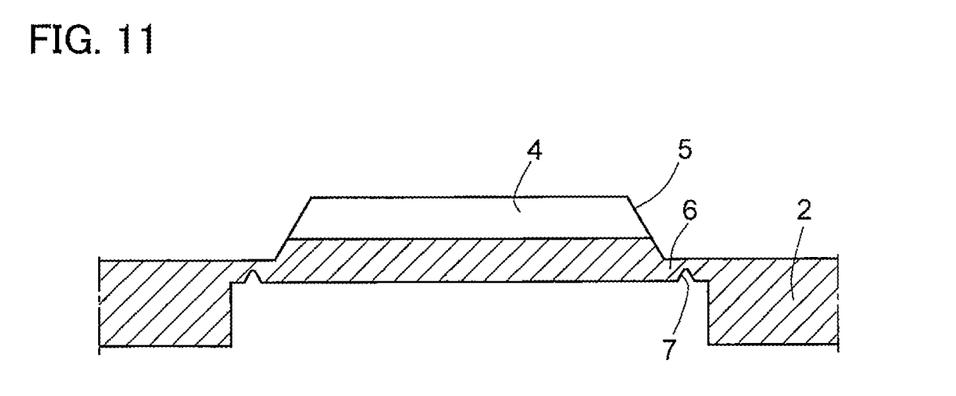
FIG. 11 is a sectional view showing a modification of the rupture groove.

Also, for this battery lid, since the plate surface of the thin plate portion 6 on the side opposite from the rupture groove 7 has a flat surface shape extending perpendicularly to the thickness direction, three-dimensional measurement is not required when measuring the thickness of the thin plate portion 6 at the bottom of the rupture groove 7, thus facilitating this thickness measurement. While, in the example of FIGS. 3 and 4, the rupture groove 7 is engraved on the one side of the thin plate portion 6, the rupture groove 7 may be engraved on the other side of the thin plate portion 6 as illustrated in FIG. 11 with the plate surface of the thin plate portion 6 on the one side having the flat surface shape. In this case, too, the above thickness measurement is easy.

Also, for this battery lid, since the thickness of the metal plate (thickness t1 of the surrounding plate portion 2) is not less than 2.0 mm and not more than 5.0 mm, it is possible to ensure sufficient strength suitable for a large-sized battery case, and sufficiently increase the opened area of the valve 1 for such a battery case, while reducing the unit cost by production using progressive dies.

Figure 12:
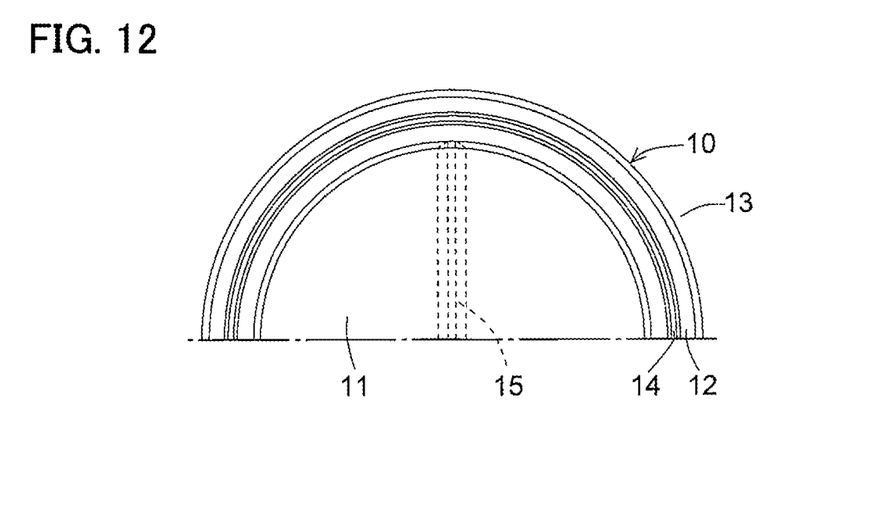
FIG. 12 is a partial front view of a battery lid according to a second embodiment of the present invention.
Figure 13:
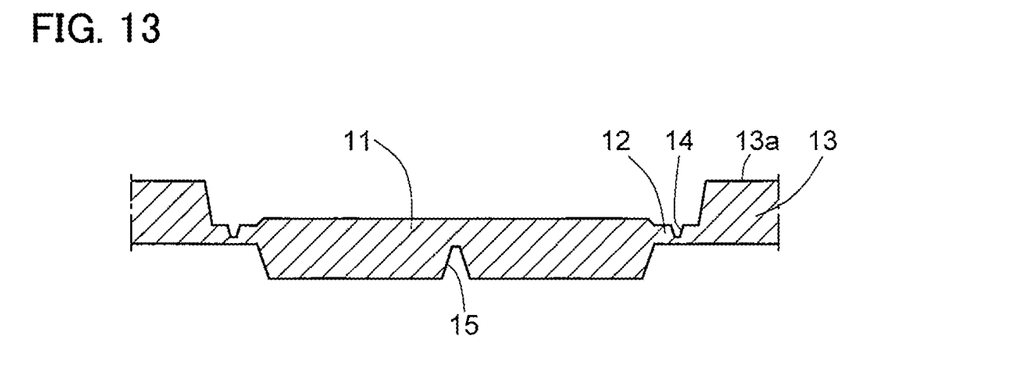
FIG. 13 is a sectional view of the valve of FIG. 12.
Figure 14:
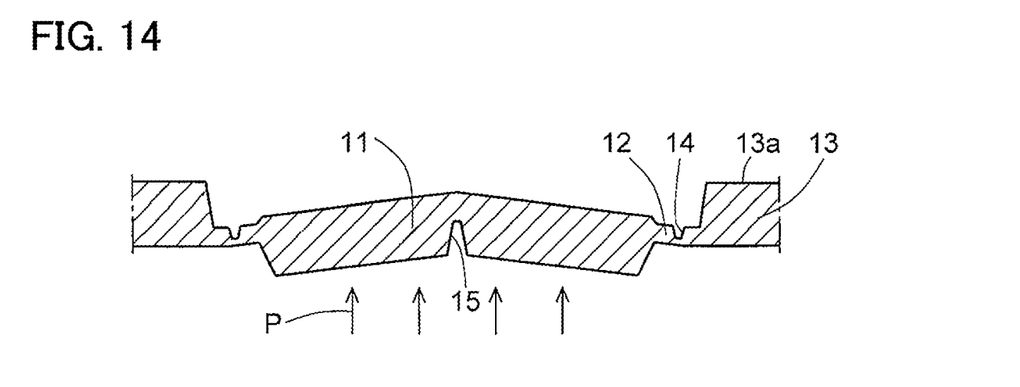
FIG. 14 is a sectional view showing the state in which the pressure receiving plate portion of FIG. 13 is bent.

While, in the first embodiment, the pressure receiving plate portion protrudes only toward its side which becomes the outer side of the case body, the pressure receiving plate portion may have a different structure, provided that it is (i) constituted, of the portion of the metal plate allowed to be separated by the rupture of the rupture groove, by the bending groove and a thick plate portion continuous with both sides of the bending groove and protruding relative to the thin plate portion, and (ii) bendable from the bending groove such that the valve is not ruptured until a predetermined pressure is exceeded. For example, the pressure receiving plate portion may protrude only toward the side which becomes the inner side of the case body, or preferably protrude toward both sides. FIGS. 12 to 14 illustrate the second embodiment as one example thereof. Only the features of the second embodiment different from those of the first embodiment are described below.

As illustrated in FIGS. 12 and 13, the pressure receiving plate portion 11 of the valve 10 has an outer periphery protruding, relative to the thin plate portion 12, toward the one side and the other side, respectively. The height of the section of the pressure receiving plate portion 11 protruding, relative to the thin plate portion 12, toward the one side is larger than the height of the section of the pressure receiving plate portion 11 protruding, relative to the thin plate portion 12, toward the other side.

This battery lid is used with the other side as the outer side, and with the one side as the inner side. The "outer side" refers to, with the battery lid attached to the case body (not shown), the outer side of the case, and the "inner side" refers to the inner side of the case.

The valve 10 is recessed inwardly relative to the outer plate surface 13a of the surrounding plate portion 13. The rupture groove 14 is engraved on the outer side of the thin plate portion 12. The bending groove 15 extends toward the inner side of the pressure receiving plate portion 11.

When the internal pressure of the battery (not shown) including the battery lid of FIG. 13 increases, as illustrated in FIG. 14, pressure (internal pressure of the battery) P is applied to the valve 10, thereby pushing, relative to the surrounding plate portion 13, the pressure receiving plate portion 11 and the thin plate portion 12 toward the outer side, so that the pressure receiving plate portion 11 is bent from the bending groove 15 and deformed. While the width of the bending groove 15 is narrowed by this bend and deformation, the pressure P reaches a predetermined value and the valve 10 ruptures and opens, before the bending groove 15 is closed and any further bend and deformation become impossible.

Since the valve 10 of this battery lid is recessed inwardly relative to the outer plate surface 13a of the surrounding plate portion 13, the valve 10 is less likely to receive mechanical damage from outside after assembling the battery.

Also, for this battery lid, the minimum thickness of the pressure receiving plate portion 11 is larger than the maximum thickness of the thin plate portion 12, and the pressure receiving plate portion 11 has an outer periphery protruding, relative to the thin plate portion 12, toward both sides, around the entire circumference. Therefore, compared to the first embodiment, in which the pressure receiving plate portion protrudes only toward the one side, it is possible to reduce the volume movement amount of the forming material from each side (recess of a dowel forming portion), further facilitate pressing, and reduce the burden on the dies. Also, it is possible to reduce the height of the section of the pressure receiving plate portion 11 protruding toward the outer side, so that the valve 10 is less likely to receive mechanical damage from outside after assembling the battery.

Especially since the height of the section of the pressure receiving plate portion 11 protruding, relative to the thin plate portion 12, toward the inner side is larger than the height of the section of the pressure receiving plate portion 11 protruding, relative to the thin plate portion 12, toward the outer side, the valve 10 can be easily positioned inside of the outer plate surface 13a of the surrounding the plate portion 13.

Figure 15:
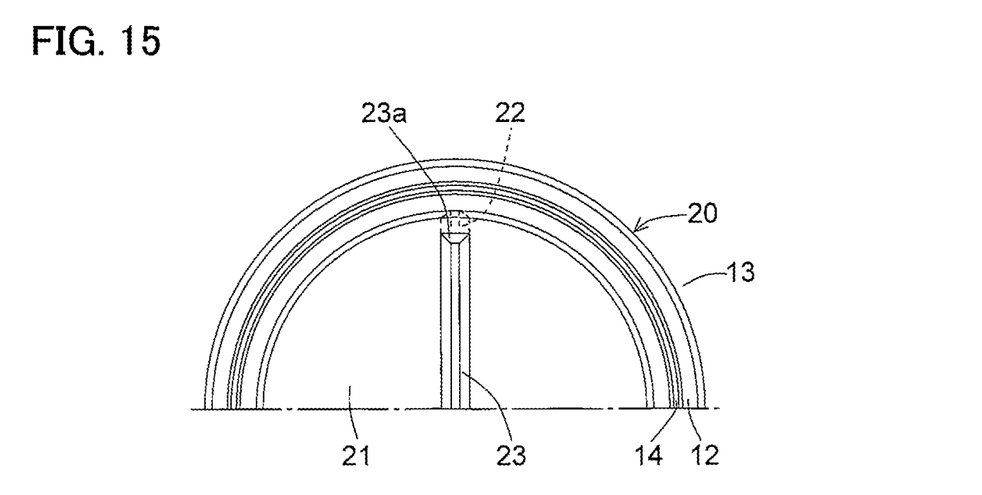
FIG. 15 is a partial front view of a battery lid according to a third embodiment of the present invention.
Figure 16:
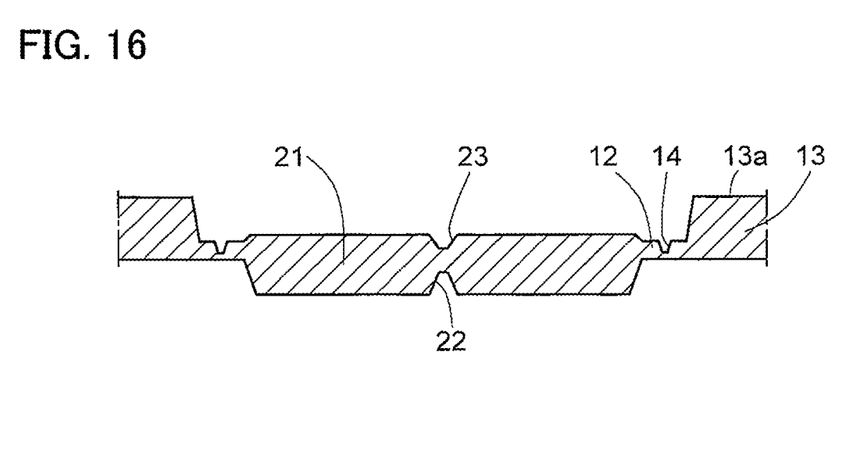
FIG. 16 is a sectional view of the valve of FIG. 15.

While, in each of the above first and second embodiments, the thickness of the pressure receiving plate portion at the bottom of the bending groove is defined only by the depth of the bending groove, a recess may be formed at a position opposite from the bending groove, thereby further reducing the thickness at the bending groove bottom. FIGS. 15 and 16 illustrate the third embodiment as one example thereof.

The valve 20 of FIGS. 15 and 16 is different from the valve of the second embodiment only in that the valve 20 has inner and outer bending grooves 22 and 23 on both sides of the pressure receiving plate portion 21, respectively. The bending groove 22, 23 on each side is a recess formed at a position opposite from the other bending groove, and having a depth in the thickness direction.

The outer bending groove 23 does not completely extend across the pressure receiving plate portion 21. That is, the pressure receiving plate portion 21 has a solid outer peripheral portion 23a closing the outer bending groove 23.

For this battery lid, since the pressure receiving plate portion 21 has one of the bending grooves 22, 23 on one side as a recess formed at a position opposite from the other bending groove 23, 22, and having a depth in the thickness direction, it is possible to alleviate the influence of the volume movement of the forming material when forming the bending grooves 22 and 23, on the formation of the thin plate portion 12. In particular, while the smaller the thickness between the bending grooves 22 and 23, the more easily the pressure receiving plate portion 21 can be bent, in the second embodiment, in which the pressure receiving plate portion has the bending groove only on one side thereof, the volume movement amount of the forming material when forming the bending groove deeply on one side is pushed out in the plate surface direction only on one side, thus somewhat affecting the formation of the thin plate portion. For the battery lid of the third embodiment, since the bending grooves 22 and 23 are relatively shallow grooves formed from both sides, it is possible to reduce the volume movement amount pushed out in the plate surface direction on each side.

The outer peripheral portion 23a may be omitted so that the bending groove 23 on one side extend completely across the pressure receiving plate portion 21, but providing the outer peripheral portion 23a is advantageous in that the volume movement amount near the section on the line extending from the bending groove 23 decreases.

Also, for this battery lid, because the pressure receiving plate portion 21 has no bending grooves other than the bending grooves 22 and 23 on both sides thereof, and their widthwise centers both pass through the symmetry plane, the number of the sections on the lines extending from the bending grooves 22 and 23 can be limited to two around the pressure receiving plate portion 21.

Figure 17:
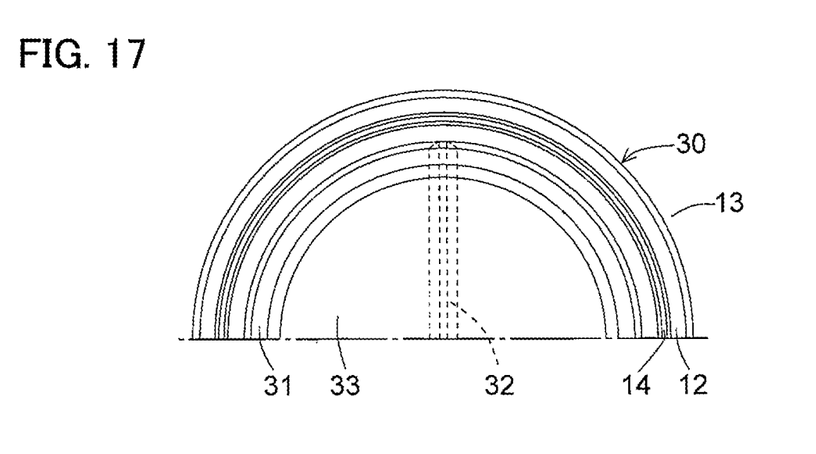
FIG. 17 is a partial front view of a battery lid according to a fourth embodiment of the present invention.
Figure 18:
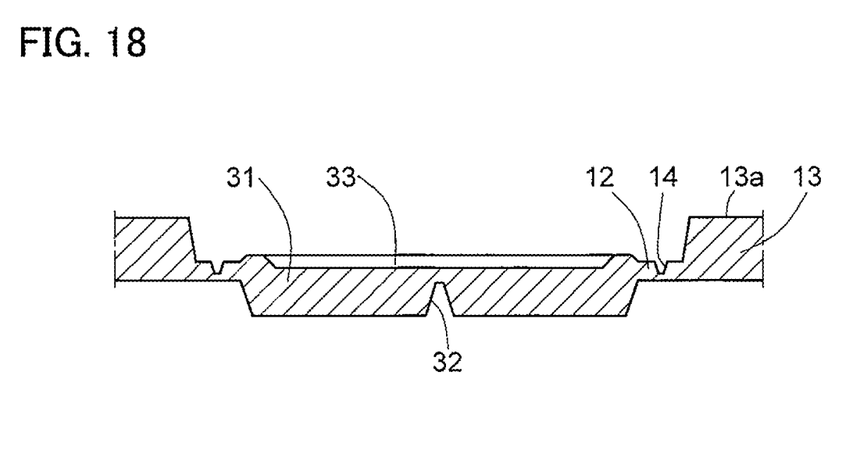
FIG. 18 is a sectional view of the valve of FIG. 17.

FIGS. 17 and 18 illustrate the fourth embodiment of the present invention as another example in which a recess is formed at a position opposite from the bending groove.

The pressure receiving plate portion 31 of the valve 30 of FIGS. 17 and 18 is different from the pressure receiving plate portion of the third embodiment only in that the plate portion 31 has a bending groove 32 only on the inner side, and has a circular recess 33 on the outer side.

The recessed bottom surface of the recess 33 has the flat surface shape. The recessed inner periphery of the recess 33 has a conical shape concentric with the pressure receiving plate portion 31, and radially expanding toward the outer side. The depth of the recess 33 in the thickness direction is defined by its recessed bottom surface. The recessed bottom surface of the recess 33 has, across the entire area closer to the center than is the recessed inner periphery, a width larger than the width of the bending groove 32.

For this battery lid, too, since the pressure receiving plate portion 31 has a recess 33 formed at a position opposite from the bending groove 32, and having a depth in the thickness direction, it is possible to alleviate the influence of the volume movement when forming the bending groove 32, on the formation of the thin plate portion 12. The recess 33 is not groove-shaped but shaped to be opposed, only at its flat surface-shaped recessed bottom surface, to the bending groove 32 in the thickness direction. Therefore, while the volume movement amount on the outer side during formation is relatively large compared to the third embodiment, the fourth embodiment is advantageous in that cracks are less likely to be formed at the bottom of the bending groove 32.

Figure 19:
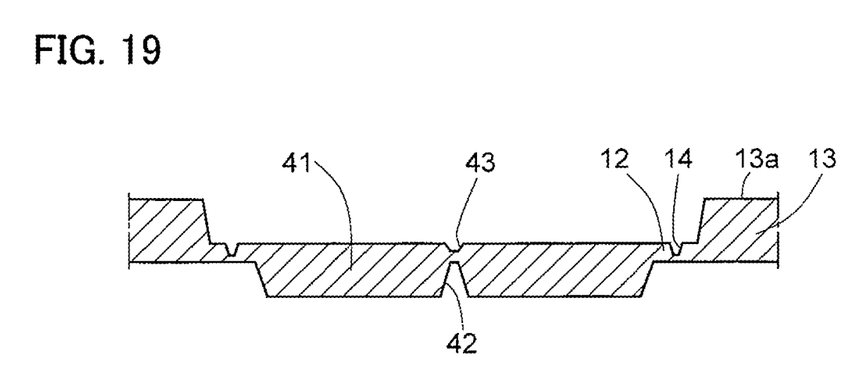
FIG. 19 is a partial front view of a battery lid according to a fifth embodiment of the present invention.
Figure 20:
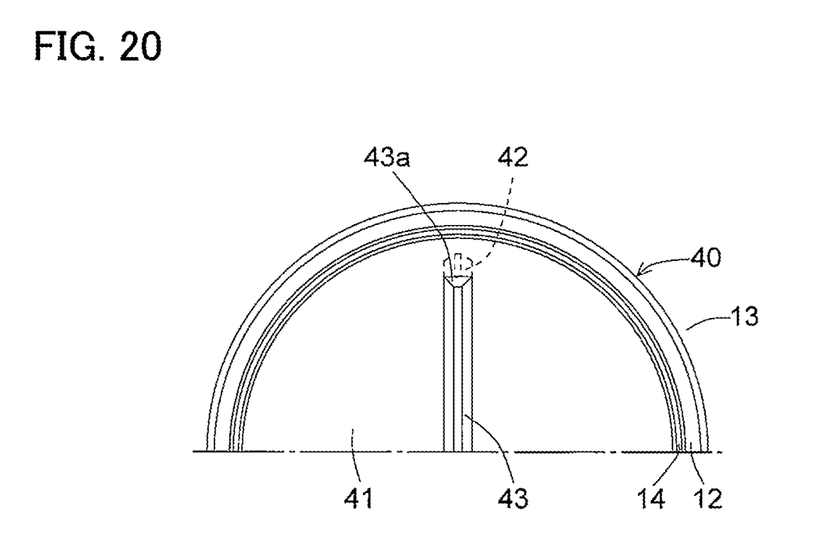
FIG. 20 is a sectional view of the valve of FIG. 19.

FIGS. 19 and 20 illustrate the fifth embodiment of the present invention as still another example in which a recess is formed at a position opposite from the bending groove.

The pressure receiving plate portion 41 of the valve 40 of FIGS. 19 and 20 is different from the pressure receiving plate portion of the third embodiment in that the minimum thickness of the plate portion 41 (thickness between the bottoms of the bending grooves 42 and 43) is smaller than the maximum thickness of the thin plate portion 12. This arrangement, in which the thickness between the bottoms of the bending grooves 42 and 43 is smaller than the maximum thickness of the thin plate portion 12, is suitable for the case where the pressure by which the valve 40 is ruptured is set to a relatively small value.

For the valve 40, in order to reduce the minimum thickness of the pressure receiving plate portion 41, the pressure receiving plate portion 41 protrudes, relative to the thin plate portion 12, only toward the inner side, and has the flat surface shape between the outer bending groove 43 and the rupture groove 14. The inner bending groove 42 has a depth larger than the depth of the outer bending groove 43. Both ends of the outer bending groove 43 are closed by solid portions 43a, respectively. The solid portions 43a at both ends resist bend and deformation of the pressure receiving plate portion 41 from the bending grooves 42 and 43. Therefore, while the minimum thickness of the pressure receiving plate portion 41 is smaller than the maximum thickness of the thin plate portion 12, the pressure receiving plate portion 41 has required bend and deformation resistance to the internal pressure of the battery or a load from outside.

Since, in each of the above embodiments, (i) the pressure receiving plate portion 5, 11, 21, 31, 41 has the bending groove(s) 4, 15, 22, 23, 32, 42, 43, and a protruding portion continuous with the bending groove(s) 4, 15, 22, 23, 32, 42, 43, and protruding, relative to the thin plate portion 6, 12, toward one or both sides in the thickness direction; (ii) the plate surfaces of the pressure receiving plate portion 5, 11, 21, 31, 41 and the thin plate portion 6, 12 on the other side in the thickness direction form a recessed bottom surface having a depth in the thickness direction toward the one side relative to the plate surface of the surrounding plate portion 2, 13 on the other side in the thickness direction; and (iii) the protruding portion of the pressure receiving plate portion 5, 11, 21, 31, 41 has a thickness larger than the thickness of the thin plate portion 6, 12, the battery lid of the present invention has the following advantages: With the arrangement in which the plate surfaces of the pressure receiving plate portion 5, 11, 21, 31, 41 and the thin plate portion 6, 12 on the other side in the thickness direction form a recessed bottom surface having a depth toward the one side relative to the plate surface of the surrounding plate portion 2, 13 on the other side in the thickness direction, when forming the pressure receiving plate portion 5, 11, 21, 31, 41 and the thin plate portion 6, 12, by pushing the metal plate material in the thickness direction, the recessed bottom surface is formed. At this time, by pushing out, in the thickness direction, a plastically flowing excess portion of the metal plate, it is possible to form the protruding portion of the pressure receiving plate portion 5, 11, 21, 31, 41 thicker than the thin plate portion 6, 12. Therefore, it is possible to reduce pressing pressure, the amount of an excess portion of the metal plate pushed out in the width direction, die accuracy, etc. When the internal pressure P of the battery is applied to the valve 1, 10, 20, 30, 40, since the protruding portion of the pressure receiving plate portion 5, 11, 21, 31, 41, which is relatively thick and less likely to deform, is continuous with the bending groove(s) 4, 15, 22, 23, 32, 42, 43, and is formed symmetrically with respect to the above symmetry plane, the pressure receiving plate portion 5, 11, 21, 31, 41 can be reliably bent from the bending groove(s) 4, 15, 22, 23, 32, 42, 43. Therefore, even if the thickness of the metal plate and the opened area of the valve 1, 10, 20, 30, 40 are increased to use the battery lid on a large-sized battery case, by forming the pressure receiving plate portion 5, 11, 21, 31, 41 to protrude, it is possible to, for example, reduce pressing pressure, and the amount of an excess portion of the metal plate material pushed out in the width direction, and to improve die accuracy. Therefore, it is possible to reduce the production cost, and the quality management cost of the valve 1, 10, 20, 30, 40.

Also, in each of the third and fifth embodiments, since one end or both ends of the bending groove 23, 43 are closed by the outer peripheral portion 23a or by the solid portions 43a of the pressure receiving plate portion 21, 41, it is possible to alleviate, during pressing, the volume movement amount near the sections on the lines extending from the bending groove 22, 43. This arrangement is also advantageous in that it is possible to reduce the influence on the formation of the thin plate portion 6, 12 at the sections on the lines extending from the bending groove 23, 43, thereby hindering the rupture groove 7, 14 from changing irregularly.

Also, in each of the above embodiments, since the bending groove(s) 4, 15, 22, 23, 32, 42, 43 is not continuous with the rupture groove 7, 14, it is possible to reduce the plastic flow when forming the bending groove(s), and thicken the pressure receiving plate portion 5, 11, 21, 31, 41, including the bending groove(s) 4, 15, 22, 23, 32, 42, 43.

Also, in each of the first to third embodiments, since (i) the pressure receiving plate portion 5, 11, 21 has an outer periphery protruding, relative to the thin plate portion 6, 12, toward one side or both sides in the thickness direction, around the entire circumference; and (ii) the minimum thickness t2 of the pressure receiving plate portion 5, 11, 21, which is the thickness of the pressure receiving plate portion at the bottom of the bending groove 4, 15 or between the bottoms of the bending grooves 22 and 23, is larger than the maximum thickness of the thin plate portion 6, 12, it is possible to limit the rupture starting point without the need to form intersections at which the bending groove(s) and the rupture groove are continuous with each other. Also, it is possible to thicken the pressure receiving plate portion 5, 11, 21, including the bending groove(s) 4, 15, 22, 23. Since, as described above, the entire pressure receiving plate portion 5, 11, 21 is thicker than the thin plate portion 6, 12, and protrudes toward one side or both sides in the thickness direction, it is possible to reduce the volume movement amount of an excess portion of the metal plate material pushed out by plastic flow during pressing; reduce the difficulty of pressing; and particularly suitably reduce the production cost when a thick metal plate is used.

Also, in each of the above embodiments, since (i) the thin plate portion 6, 12 has a plate surface located between, and connected to, the rupture groove 7, 14 and the pressure receiving plate portion 5, 11, 21, 31 and 41; a plate surface located between, and connected to, the rupture groove 7, 14 and the surrounding plate portion 2, 13; and a plate surface located at a position opposite, in the thickness direction, from the first-mentioned two plate surfaces and the rupture groove 7, 14; (ii) these three plate surfaces have a flat surface shape extending perpendicularly to the thickness direction; and (iii) the plate surface of the surrounding plate portion 2, 13 on the one side in the thickness direction, and the plate surfaces of the thin plate portion 6, 12 on the one side in the thickness direction lie in a single common plane, it is possible to simplify dies, and easily stabilize the rupture pressure.

In particular, if the plate surfaces of the thin plate portion and the surrounding plate portion on the one side do not lie on a single common plane, it will be necessary to press, with dies, the thin plate portion from the upper side and the lower side so as to be recessed, relative to the surrounding plate portion, from both sides in the thickness direction, and an additional die element will be required for this purpose. By using the additional die element, the number of die elements, which affects the accuracy of the thickness control of the thin plate portion, will increase, and the die elements for pressing the thin plate portion upwardly and downwardly are susceptible to breakage. In contrast, in each of the above embodiments, since the thin plate portion is not recessed from both sides, it is possible to use a simple die structure as shown in FIG. 6, thereby increasing the rigidity of the dies, and producing the dies at a low cost. Also, it is possible to easily improve the accuracy of the thickness of the thin plate portion 6, 12.

Also, in the case where the thin plate portion is pressed, with dies, from the upper and lower sides so as to be recessed, relative to the surrounding plate portion, from both sides in the thickness direction, if the position, relative to the surrounding plate portion, of the thin plate portion in the thickness direction is displaced, when the rupture groove is engraved on the thin plate portion in a subsequent step, the engraving die may deform the thin plate portion inappropriately, thereby destabilizing rupture pressure. In contrast, in each of the above embodiments, since the thin plate portion 6, 12 is not pressed from both of the upper and lower sides, the position, relative to the thin plate portion, of the thin plate portion in the thickness direction tends to be stable, and thus rupture pressure tends to be stable.

The above-described embodiments are mere examples in every respect, and the present invention is not limited thereto. The scope of the present invention is indicated by the claims, and should be understood to include all modifications within the scope and meaning equivalent to the scope of the claims.

DESCRIPTION OF REFERENCE NUMERALS

1, 10, 20, 30, 40: Valve
2, 13: Surrounding plate portion
4, 15, 22, 23, 32, 42, 43: Bending groove
5, 11, 21, 31, 41: Pressure receiving plate portion
6, 12: Thin plate portion
7, 14: Rupture groove

The invention claimed is:
1. A battery lid comprising:
a metal plate,
wherein the metal plate is integrally formed with:
a valve configured to be ruptured when a predetermined pressure is applied to the valve; and
a surrounding plate portion surrounding the valve, and connected to the valve,
wherein the valve comprises:
a pressure receiving plate portion configured to be bent from a bending groove by pressure; and
a thin plate portion having a thickness smaller than a thickness of the surrounding plate portion, and connecting the pressure receiving plate portion and the surrounding plate portion to each other,
wherein the thin plate portion has a rupture groove engraved to have a depth in a thickness direction, and to pass through extension sections on respective imaginary lines extending from the bending groove,
wherein the extension sections on the respective imaginary lines extending from the bending groove consist of only two sections around the pressure receiving plate portion,
wherein each of the pressure receiving plate portion and the thin plate portion is symmetrical with respect to a symmetry plane passing through a widthwise center of the bending groove, and extending in the thickness direction,
wherein the valve is configured such that, as the pressure receiving plate portion is bent from the bending groove and deformed by pressure applied to the valve, the extension sections are pulled more strongly than are any portions of the valve other than the extension sections in the valve, such that, when the predetermined pressure is applied to the valve, the valve is ruptured from one of the extension sections of the rupture groove, and
wherein the pressure receiving plate portion projects above the surrounding plate portion.

2. The battery lid according to claim 1, wherein the pressure receiving plate portion has an outer periphery protruding in the thickness direction, relative to the thin plate portion, toward at least one of two sides, around an entire circumference.

3. The battery lid according to claim 2, wherein a minimum thickness of the pressure receiving plate portion, which is a thickness of the pressure receiving plate portion at a bottom of the bending groove, is larger than a maximum thickness of the thin plate portion.

4. The battery lid according to claim 1, wherein a plate surface of the thin plate portion on a side opposite, in the thickness direction, from a side formed with the rupture groove has a flat surface shape extending perpendicularly to the thickness direction.

5. The battery lid according to claim 1, wherein the valve is recessed inwardly relative to an outer plate surface of the surrounding plate portion.

6. The battery lid according to claim 1, wherein the pressure receiving plate portion has, at a position opposite in the thickness direction from the bending groove, a recess having a depth in the thickness direction.

7. The battery lid according to claim 1, wherein the metal plate has a thickness of not less than 2.0 mm and not more than 5.0 mm.

8. The battery lid according to claim 1, wherein the pressure receiving plate portion has:
the bending groove; and
a protruding portion continuous with the bending groove, and protruding, relative to the thin plate portion, toward a first side of two sides in the thickness direction,
wherein a plate surface of the surrounding plate portion on the first side in the thickness direction, and a plate surface of the thin plate portion on the first side in the thickness direction lie in a single common plane,
wherein a plate surface of the pressure receiving plate portion and a plate surface of the thin plate portion that are located on a second side of the two sides in the thickness direction, which is opposite from the first side, form a recessed bottom surface having a depth toward the first side in the thickness direction, relative to a plate surface of the surrounding plate portion on the second side in the thickness direction, and
wherein the protruding portion of the pressure receiving plate portion has, between a plate surface thereof on the second side and a plate surface thereof on the first side, a thickness larger than a thickness of the thin plate portion in the thickness direction.

9. The battery lid according to claim 8, wherein the protruding portion protrudes, relative to the thin plate portion, toward the first side and the second side in the thickness direction.

10. The battery lid according to claim 1, wherein at least one end of the bending groove is closed by an outer peripheral portion or a solid portion of the pressure receiving plate portion.

11. The battery lid according to claim 1, wherein the bending groove and the rupture groove are not continuous with each other.

12. The battery lid according to claim 1, wherein the thin plate portion has:
- a first plate surface located between, and connected to, the rupture groove and the pressure receiving plate portion;
- a second plate surface located between, and connected to, the rupture groove and the surrounding plate portion; and
- a third plate surface located on a side opposite, in the thickness direction, from the first and second plate surfaces and the rupture groove;
- wherein each of the first, second and third plate surfaces has a flat surface shape extending perpendicularly to the thickness direction, and
- wherein a plate surface of the surrounding plate portion on side in the thickness direction, and the first and second plate surfaces of the thin plate portion on the side in the thickness direction lie in a single common plane.

* * * * *